US009621934B2

(12) United States Patent
Seastrom et al.

(10) Patent No.: US 9,621,934 B2
(45) Date of Patent: Apr. 11, 2017

(54) APPARATUS, METHOD AND COMPUTER PROGRAM PRODUCT FOR ERROR CORRECTION IN VARIABLY RELIABLE AND/OR HIERARCHICAL NETWORKS

(71) Applicant: Time Warner Cable Enterprises LLC, New York, NY (US)

(72) Inventors: Robert Seastrom, Leesburg, VA (US); Wesley E. George, IV, Manassas, VA (US); Chris R. Roosenraad, Vienna, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 198 days.

(21) Appl. No.: 14/463,810

(22) Filed: Aug. 20, 2014

(65) Prior Publication Data
US 2014/0359389 A1 Dec. 4, 2014

Related U.S. Application Data

(63) Continuation of application No. 12/987,247, filed on Jan. 10, 2011, now Pat. No. 8,813,144.

(51) Int. Cl.
*H04L 1/18* (2006.01)
*H04N 21/24* (2011.01)
(Continued)

(52) U.S. Cl.
CPC ........... *H04N 21/2402* (2013.01); *H04L 1/08* (2013.01); *H04L 12/18* (2013.01);
(Continued)

(58) Field of Classification Search
CPC ..................................................... H04L 1/1809
(Continued)

(56) References Cited

U.S. PATENT DOCUMENTS 6,278,716 B1* 8/2001 Rubenstein ........... H04L 1/1819
370/394
7,792,963 B2 9/2010 Gould
(Continued)

OTHER PUBLICATIONS

Content delivery network, downloaded from http://en.wikipedia.org/wiki/Content_delivery_network on Jul. 31, 2014.
(Continued)

*Primary Examiner* — Fritz Alphonse
(74) *Attorney, Agent, or Firm* — Otterstedt, Ellenbogen & Kammer, LLP

(57) ABSTRACT

A file is multicast from an error-correcting multicast apparatus to a plurality of endpoints forming a first multicast group, over a network segmented into at least second and third multicast groups. The second and third multicast groups are subsets of the first multicast group. Given ones of the endpoints are assigned to the second and third multicast groups based on likelihood of experiencing similar errors. At the error-correcting multicast apparatus, over the network, a retransmission request is obtained from a first one of the endpoints, based on at least one of loss and corruption of a portion of the file during the multicasting of the file to the first one of the endpoints. The portion of the file is retransmitted, via multicasting, over the network, to one of the second and third multicast groups.

30 Claims, 8 Drawing Sheets

(51) Int. Cl.
| | |
|---|---|
| H04N 21/236 | (2011.01) |
| H04N 21/61 | (2011.01) |
| H04L 1/08 | (2006.01) |
| H04L 12/18 | (2006.01) |
| H04N 21/2385 | (2011.01) |

(52) U.S. Cl.
CPC ... *H04N 21/2385* (2013.01); *H04N 21/23608* (2013.01); *H04N 21/6118* (2013.01)

(58) Field of Classification Search
USPC .................. 714/748, 749, 762, 740, 746
See application file for complete search history.

(56) References Cited

U.S. PATENT DOCUMENTS

| | | | |
|---|---|---|---|
| 8,261,148 B2 * | 9/2012 | Weinman | H04L 12/1868 714/748 |
| 8,306,049 B2 * | 11/2012 | Takahashi | H03M 13/356 370/390 |
| 8,542,593 B1 * | 9/2013 | Kumar | H04L 1/0078 370/235 |
| 2003/0056217 A1 | 3/2003 | Brooks | |
| 2006/0130107 A1 | 6/2006 | Gonder | |
| 2007/0033609 A1 * | 2/2007 | Dei | H04L 12/1827 725/25 |
| 2007/0217436 A1 | 9/2007 | Markley | |
| 2009/0248794 A1 | 10/2009 | Helms | |
| 2010/0313236 A1 | 12/2010 | Straub | |
| 2014/0189212 A1 * | 7/2014 | Slaight | G06F 12/0866 711/103 |

OTHER PUBLICATIONS

R.P. Pantos, Ed. et al., HTTP Live Streaming draft-pantos-http-live-streaming-13, downloaded from http://tools.ietf.org/html/draft-pantos-http-live-streaming-13 on Jul. 20, 2014, dated Apr. 16, 2014.
HTTP Live Streaming, downloaded from http://en.wikipedia.org/wiki/HTTP_Live_Streaming on Jul. 30, 2014.
M. Luby et al., Layered Coding Transport (LCT) Building Block, downloaded from https://www.ietf.org/rfc/rfc3451.txt on Jun. 30, 2014, dated Oct. 2009, Request for Comments: 5651.
B. Adamson et al., NACK-Oriented Reliable Multicast (NORM) Transport Protocol, downloaded from http://tools.ietf.org/html/rfc5740 on Jun. 30, 2014, dated Nov. 2009, Request for Comments: 5740.
M. Luby et al., Asynchronous Layered Coding (ALC) Protocol Instantiation, downloaded from http://www.hjp.at/doc/rfc/rfc3450.html on Jun. 30, 2014, dated Apr. 2010, Request for Comments: 5775.
M. Watson et al., Forward Error Correction (FEC) Framework, downloaded from http://www.hjp.at/doc/rfc/rfc6363.html on Jun. 30, 2014, dated Oct. 2011, Request for Comments: 6363.
V. Roca et al., FCAST: Object Delivery for the Asynchronous Layered Coding (ALC) and NACK-Oriented Reliable Multicast (NORM) Protocols, downloaded from http://tools.ietf.org/html/rfc6968 on Jun. 30, 2014, dated Jul. 2013, Request for Comments: 6968.
SHA-2, downloaded from http://en.wikipedia.org/wiki/SHA-2 on Jul. 31, 2014.
ITU-T, J.83, Telecommunication Standardization Sector of ITU (Dec. 2007), Digital multi-programme systems for television, sound and data services for cable distribution.

* cited by examiner

APPARATUS, METHOD AND COMPUTER PROGRAM PRODUCT FOR ERROR CORRECTION IN VARIABLY RELIABLE AND/OR HIERARCHICAL NETWORKS

FIELD OF THE INVENTION

The present invention relates generally to communications systems and methods, and, more particularly, to error correction in communications networks and the like.

BACKGROUND OF THE INVENTION

Communication networks are subject to errors being introduced during transmission from the source to a receiver; for example, due to noise or a failure of the transmission cable. Error detection techniques allow detecting these errors, while error correction seeks to permit reconstruction of the original data.

One non-limiting example of a network which is potentially subject to errors is a cable television network.

SUMMARY OF THE INVENTION

Principles of the present invention provide error correction in variably reliable and/or hierarchical networks. In one aspect, an exemplary method includes the step of multicasting a file from an error-correcting multicast apparatus to a plurality of endpoints including a first multicast group, over a network segmented into at least second and third multicast groups. The second and third multicast groups are subsets of the first multicast group. Given ones of the endpoints are assigned to the second and third multicast groups based on likelihood of experiencing similar errors. Further steps include obtaining, at the error-correcting multicast apparatus, over the network, a retransmission request from a first one of the endpoints, based on at least one of loss and corruption of a portion of the file during the multicasting of the file to the first one of the endpoints; and retransmitting the portion of the file, via multicasting, over the network, to one of the second and third multicast groups.

In another aspect, an error-correcting multicast apparatus includes a memory; at least one processor coupled to the memory; and a non-transitory persistent storage medium which contains instructions which, when loaded into the memory, configure the at least one processor to be operative to perform the method steps just described.

In still another aspect, another exemplary method includes receiving a multicast of a file from an error-correcting multicast apparatus to a first multicast group. The multicast is received at one of a plurality of endpoints forming the first multicast group, over a network segmented into at least second and third multicast groups. The second and third multicast groups are subsets of the first multicast group, and given ones of the endpoints are assigned to the second and third multicast groups based on likelihood of experiencing similar errors. Further steps include dispatching, to the error-correcting multicast apparatus, over the network, a retransmission request from the one of the endpoints, based on at least one of loss and corruption of a portion of the file during the multicasting of the file to the one of the endpoints; and receiving, at the one of the endpoints, a retransmission of the portion of the file, via multicasting, from the error-correcting multicast apparatus, over the network, to one of the second and third multicast groups.

In a further aspect, a multicast network endpoint is provided for use as one of a plurality of endpoints including a first multicast group, within a network segmented into at least second and third multicast groups. The second and third multicast groups are subsets of the first multicast group, and given ones of the endpoints are assigned to the second and third multicast groups based on likelihood of experiencing similar errors. The multicast network endpoint includes a memory; at least one processor coupled to the memory; and a non-transitory persistent storage medium which contains instructions which, when loaded into the memory, configure the at least one processor to be operative to perform the method steps just described.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

At least a portion of one or more embodiments of the invention, or elements thereof, can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, at least a portion of one or more embodiments of the invention or elements thereof can be implemented in the form of an apparatus including a memory and at least one processor that is coupled to the memory and operative to perform, or facilitate performance of, exemplary method steps. Yet further, in another aspect, at least a portion of one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

correction of errors with reduced bandwidth during retransmission;

reduction of "shock loads" on the transmission apparatus when multiple (potentially hundreds or thousands) receivers request retransmission of the same content nearly simultaneously due to being affected by the same error(s); and reduced complexity for error correction when compared with existing reliable multicast transport mechanisms.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
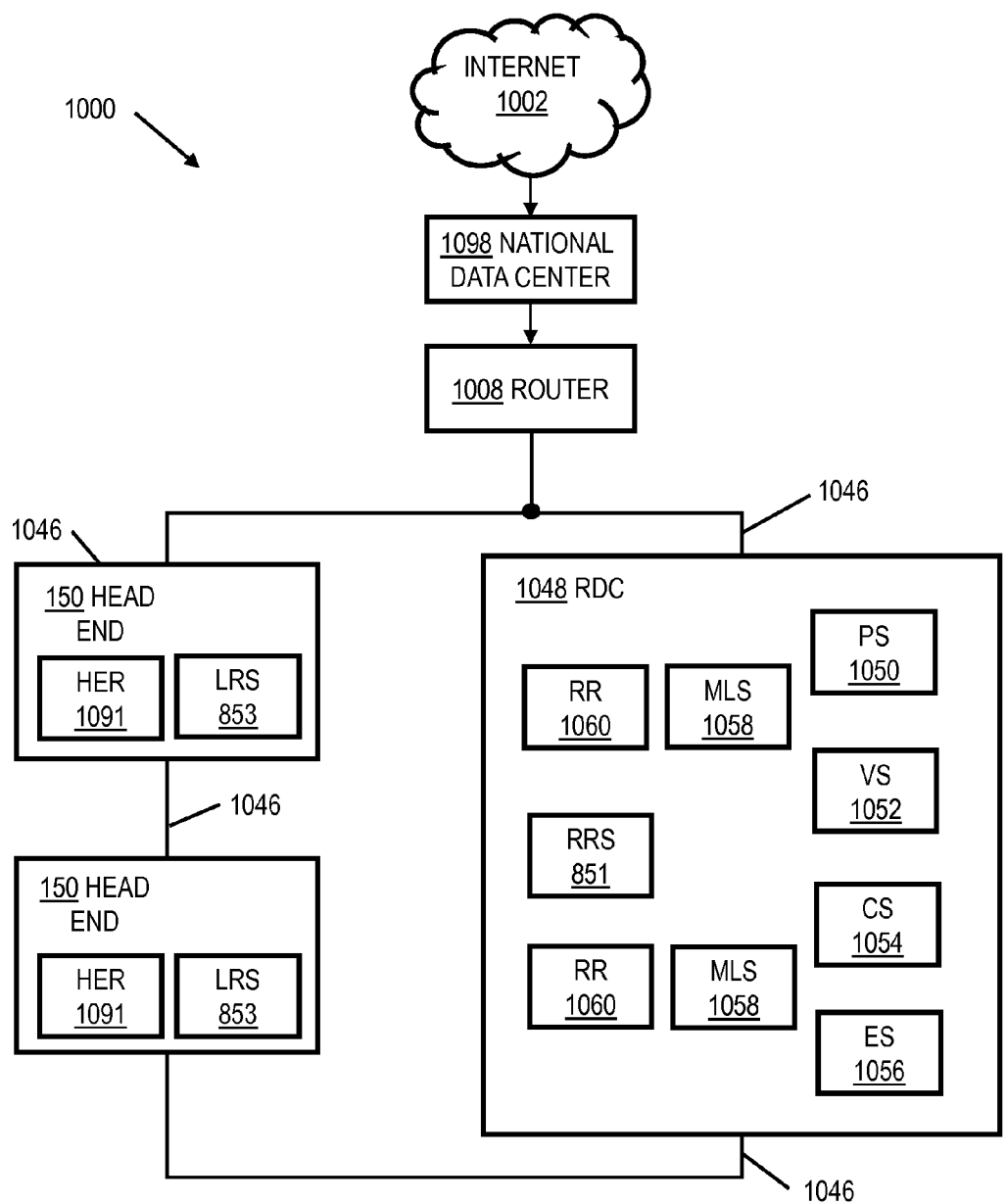
FIG. 1 is a block diagram of an exemplary embodiment of a system, within which one or more aspects of the invention can be implemented.

Many different kinds of networks can benefit from error correction. Internet Protocol (IP) services, such as data services, may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from figures below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends and/or regional data centers. For example, such an NDC might include one or more VOD servers; switched digital video (SDV) functionality; gateways to obtain content (e.g., program content) from various sources including cable feeds and/or satellite; and so on.

Furthermore, there may be multiple (e.g., two) national data centers and many regional data centers; only one of each is shown to avoid cluttering the drawings.

Figure 2:
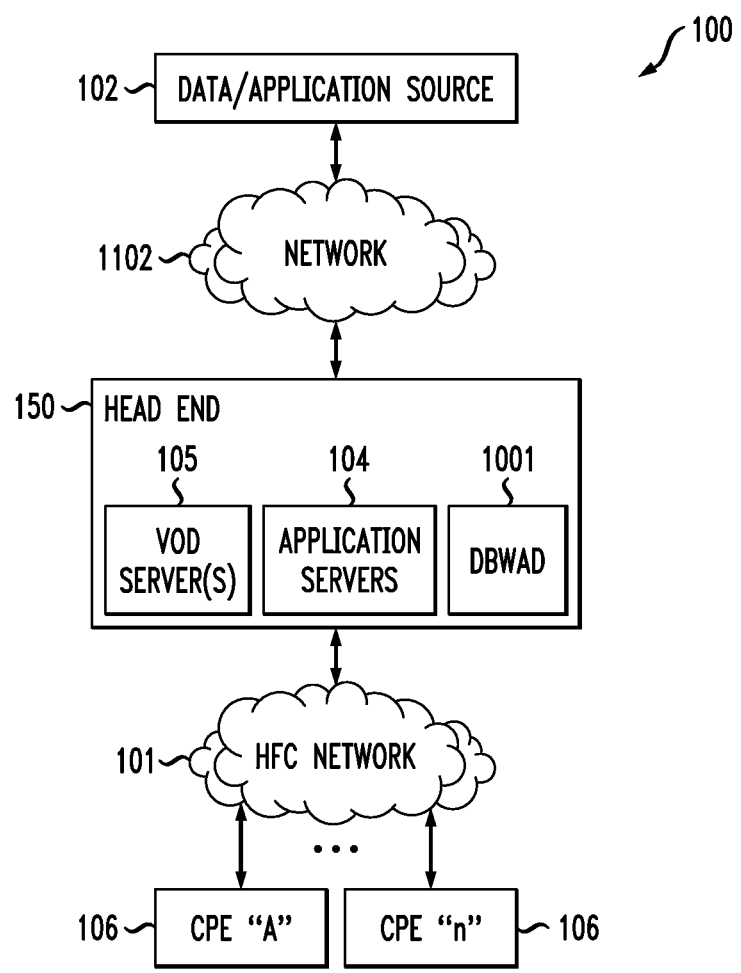
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
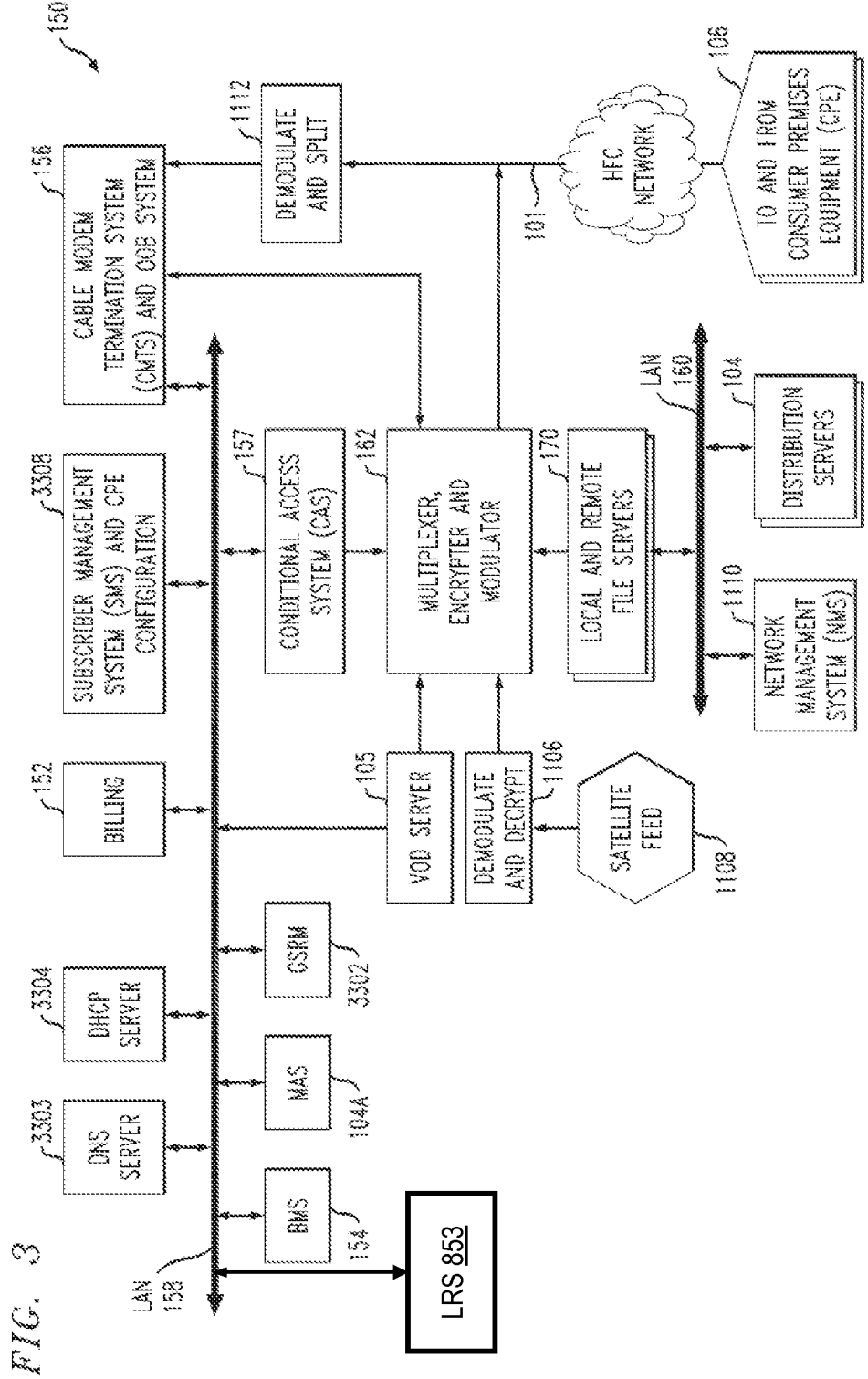
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
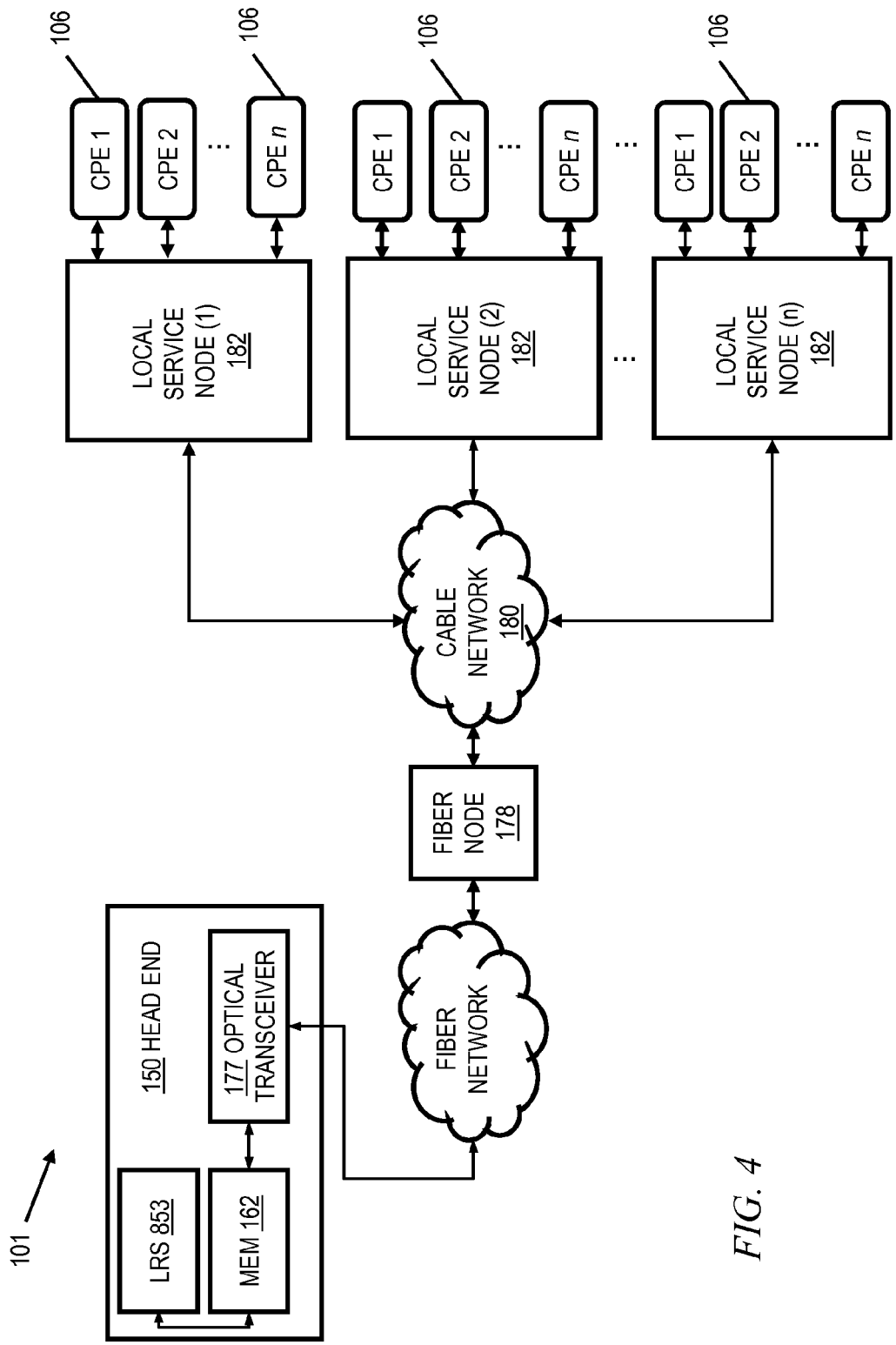
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

A video (or other) content network that also delivers data is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

It is worth noting that, until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the aforementioned Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to in this application in capital letters, without the ® symbol, for convenience.

Figure 5:
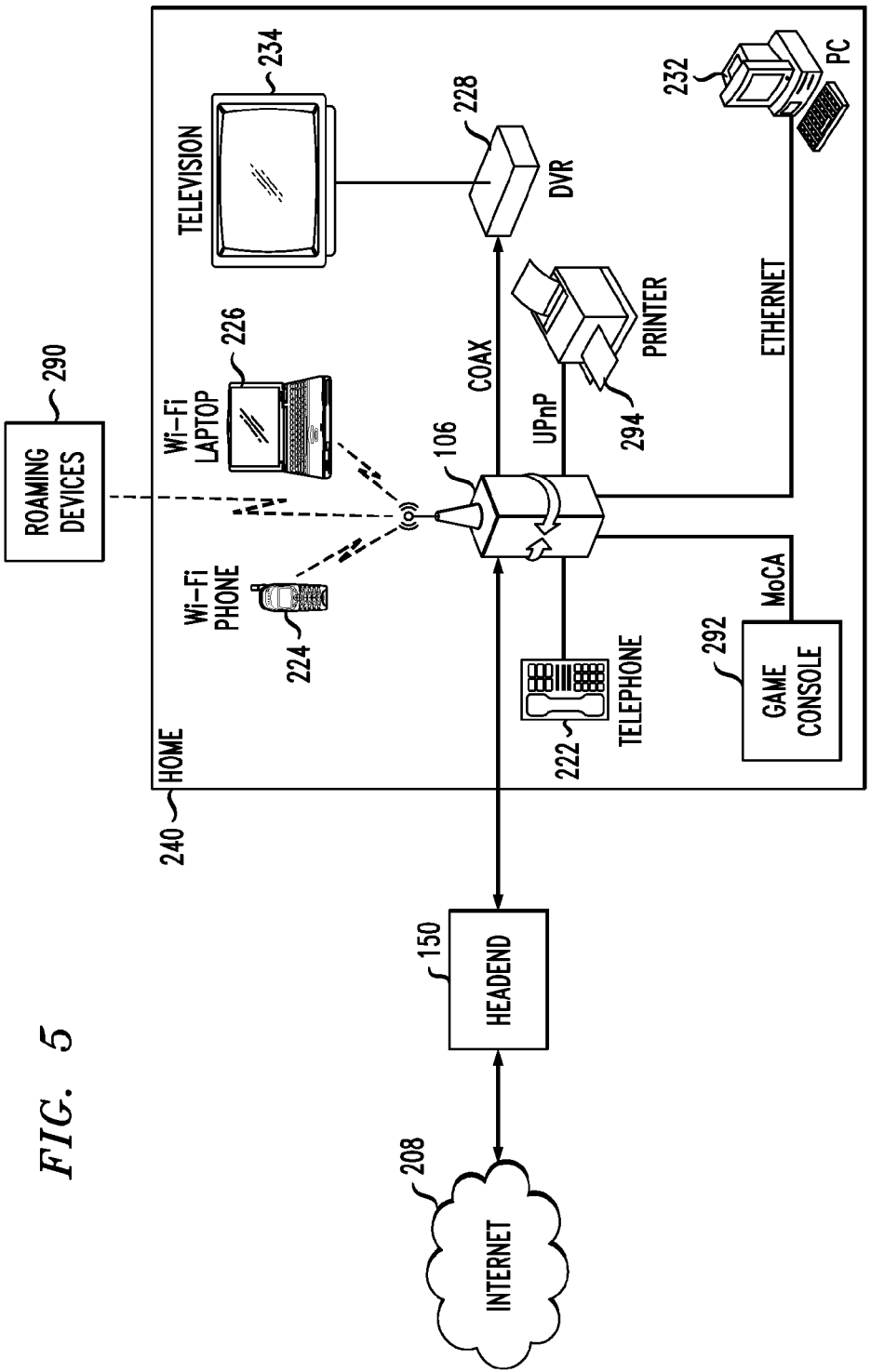
FIG. 5 is a functional block diagram of a premises network, including an exemplary centralized customer premises equipment (CPE) unit, interfacing with a head end such as that of FIG. 3.
Figure 6:
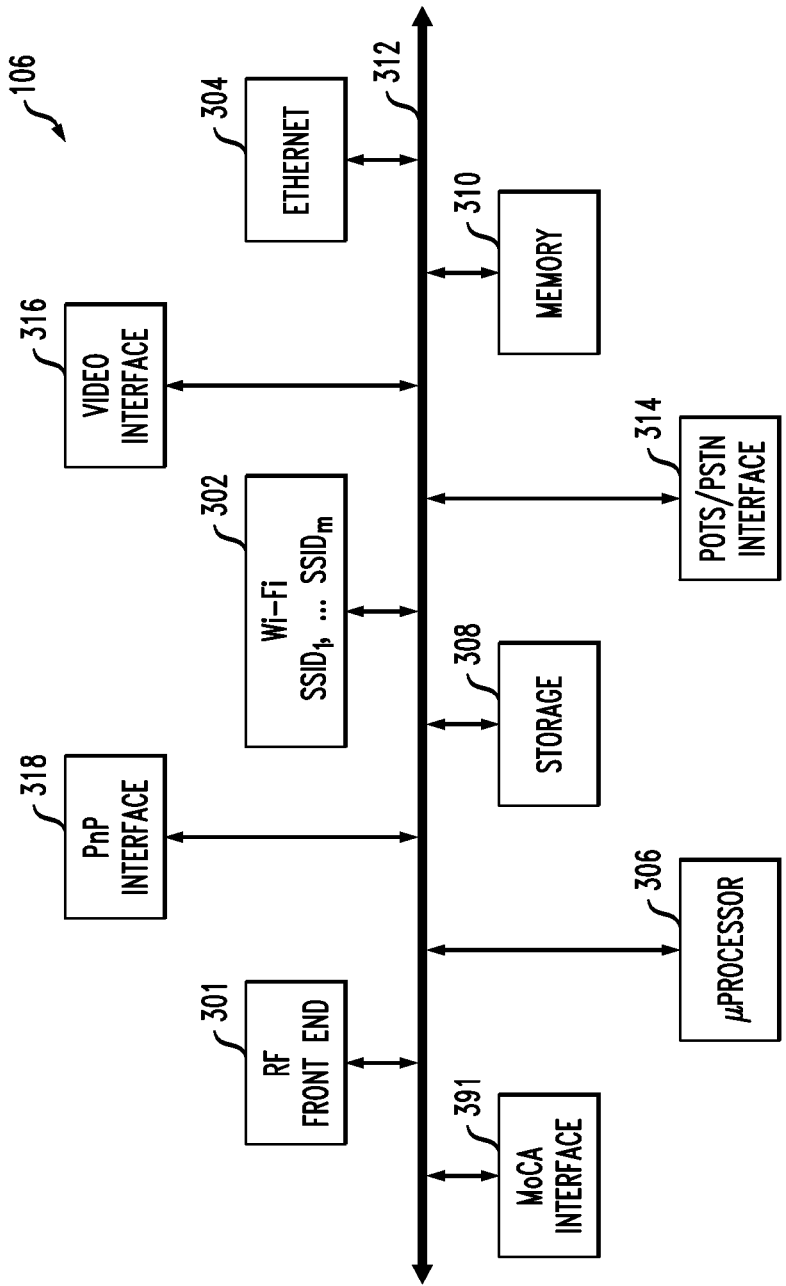
FIG. 6 is a functional block diagram of an exemplary centralized CPE unit, useful within the system of FIG. 1.

FIGS. 5 and 6 will be discussed next; it should be noted that at least some of the devices depicted therein can also be receivers of data transmitted and error-corrected in accordance with one or more embodiments described herein.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed; for example, a DOCSIS cable modem with or without the other functionality depicted in FIGS. 5 and 6, DSL modem, "plain vanilla" set-top terminal, and the like.

Exemplary CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in some cases, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC (application specific integrated circuit), FPGA (field programmable gate array), or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are possible. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits one or more of the other features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

One or more embodiments provide error correction in variably reliable networks and/or hierarchical. For example, one or more embodiments relate to correcting errors in a multicast network wherein the reliability is variable across the network from source to destination and/or where the network exhibits a hierarchical topology.

Current research for delivery of video to next-generation set-top boxes is centered around multicast transmission of H.264 video, specifically as a time series of pre-segmented files for ultimate consumption by devices that "want" HLS (HTTP Live Streaming) video. HLS, documented in IETF Internet-Draft "HTTP Live Streaming," which is expressly incorporated herein by reference in its entirety for all purposes, sets forth techniques for delivery of a transport stream that is "chunked" into files, each of which contains several seconds of encoded video.

Normal delivery of HLS is over hypertext transfer protocol (HTTP) from end to end, which implies reliable delivery guaranteed by Transmission Control Protocol (TCP). When sending over multicast, however, these files are a sequence of User Datagram Protocol (UDP) packets (UDP supports the one-to-many model implied by multicast) without the guaranteed delivery assurances offered by TCP. When examined by the receiver, pieces of the file may be found to have been damaged, corrupted, or lost in transit. H.264 decoders are much less tolerant of missing or corrupt data than existing MPEG-2 QAM (motion picture expert group-2 quadrature amplitude modulation) digital set top boxes and generally require a greater degree of assurance that the data being delivered is complete and correct.

One or more embodiments are particularly useful: (i) where the likelihood of data loss is not a constant throughout the network (variable reliability) and/or (ii) where, when one endpoint has an error, an inference can be drawn that one or more other endpoints are also likely to have suffered the same error (e.g., due to hierarchical nature of the network). For example, in a non-hierarchical network with variable reliability, if a retransmit request was received from an endpoint in one of the relatively low reliability regions, an initial response might be to send the retransmission only to endpoints within that same relatively low reliability region. Such a non-hierarchical network might have less concern with bandwidth wastage than in a hierarchical network.

Consider, by way of a non-limiting example, FIGS. 1-4 above, which exhibits both a hierarchical structure and variable reliability. The backbone (e.g., 1046) is designed to tolerate failures without traffic impact and great care is taken to avoid packet loss in routine operation. Nevertheless, in a fiber cut scenario there will be packet loss for a (very short) period of time until the network re-converges. In regional and market networks reliability is similar to the backbone (e.g., networks downstream from RDCs 1048 but still utilizing fiber optic technology).

The HFC "edge" may typically have lower reliability, however, particularly in the coax component—electrical noise, imperfect connections, and the nature of RF transmission result in a bit error rate that is sufficiently high that all layer 1/layer 2 protocols that operate in this environment (see International Telecommunication Union J.83 Digital multi-programme systems for television, sound and data services for cable distribution (QAM) and DOCSIS specifications) incorporate Forward Error Correction (FEC) to mitigate the problem. Unfortunately FEC is not 100% perfect and errors and/or data loss still happen periodically.

ITU-T J.83 (12/2007), Digital multi-programme systems for television, sound and data services for cable distribution, is expressly incorporated herein by reference in its entirety for all purposes.

As discussed further below in the section entitled "Hierarchical Nature of Exemplary HFC Network," because of the hierarchical nature of the exemplary HFC network, an error happening in one place can affect everything downstream of that point. Advantageously, one or more embodiments benefit from assuming that, when one retransmit request is received, it should be sent to all hosts within a given scope of the network.

Because problems in the network of FIGS. 1-4 are significantly more likely to happen on the edge network, they are likely to impact a relatively small group of users, geographically and topologically proximate to each other. One or more embodiments provide a technique to re-send lost or corrupted data in a way that leverages multicast efficiencies while avoiding the waste of bandwidth that would result if the corrections were sent to the comparatively huge user population that does not need them. Furthermore with regard to leveraging multicast efficiencies, the skilled artisan will appreciate that multicast allows for a single stream of data to be replicated to multiple downstream users within the network, rather than at the sender. In multicast (one-to-many or many-to-many distribution), information is addressed to a group of destination endpoints simultaneously. In contrast, unicast transmission is the sending of messages to a single network destination identified by a unique address.

Now continuing, in FIG. 4, if an error occurs at fiber node 178, then all devices (e.g., CPE 106) serviced by local service nodes (1) through (n), numbered 182, will experience that error, and request a retransmit. If an error occurs at local service node (1), then all CPE 106 serviced by local service node (1) will experience that error, but CPE serviced by local service nodes (2) through (n) will not. Generally, a failure at one point will impact downstream points but not upstream or parallel components.

It is worth noting that current practice in MPEG-2 QAM based video systems is to simply accept that data periodically gets lost or corrupted. Indeed, J.83 defines a term of art, Quasi Error Free (QEF) that states an acceptable error rate of approximately one uncorrected error event per transmission hour.

IETF protocols such as Internet Engineering Task Force (IETF) RFC 6968 FCAST: Object Delivery for the Asynchronous Layered Coding (ALC) and NACK-Oriented Reliable Multicast (NORM) Protocols (expressly incorporated herein by reference in its entirety for all purposes) center on either FEC-based approaches, NACK-based approaches, or a combination of the two, with an understanding that corrections, when transmitted via multicast, will be sent on the same multicast group as the main bearer traffic. This approach does not scale well when the receivers exhibit different loss characteristics. It should be noted at this point that "ACK" is short for acknowledgement while "NACK" refers to Negative-ACKnowledgment. NACK-based approaches operate on the assumption that all data has been received without explicit acknowledgement of each packet, expecting a negative acknowledgment of any packets which were not received or were found to be corrupted. Forward Error Correction (FEC)-based approaches assume that the amount of error correction overhead present is enough to reconstruct all but the most severe errors using traditional Forward Error Correction methods and thus additional error-correction methods are not necessary.

The aforementioned FEC-based approaches include RFC 5775, Asynchronous Layered Coding (ALC) Protocol Instantiation; RFC 5651, Layered Coding Transport (LET) Building Block; and RFC 6363, Forward Error Correction (FEC) Framework; all of which are expressly incorporated herein by reference in their entireties for all purposes. The aforementioned NACK-based approaches include NORM-RFC 5740, NACK-Oriented Reliable Multicast (NORM) Transport Protocol, expressly incorporated herein by reference in its entirety for all purposes.

Other possibilities include unicast fills of partial or full files, delivered over traditional unicast/TCP methods (as noted above, unicast transmission is the sending of messages to a single network destination identified by a unique address.).

It is worth noting that although one or more embodiments are of particular interest in an HFC environment (and thus to MSOs worldwide), this is not a limitation, and other embodiments can be applied in other similar multicast content delivery networks (or other networks) in which the clients suffer loss characteristics that can be grouped together based upon network topology or similar criteria.

In one or more embodiments, a simple multicast file transfer protocol is enhanced by adding hash checksums (in a non-limiting exemplary embodiment, SHA-256) of "chunks" or byte spans of the file, such that when data is missing or has been corrupted in transport, a particular block that needs to be filled can be identified. The skilled artisan will appreciate that hashing permits a rapid check for file segment integrity and eliminates the need for a bit-for-bit comparison (which in any event is not possible where the source material is not already available at the endpoint). In a hashing scheme, a hash is sent as well as the data, and then the receiver independently calculates the hash on the received data. If this receiver-calculated hash matches the hash sent from the transmitter, it can be assumed that the data has been received correctly. One or more embodiments are directed to how to respond to retransmission requests, regardless of how it has been determined that an error has occurred (thus resulting in the retransmission request). One or more embodiments are directed to use with an un-reliable transfer protocol (e.g., multicast using UDP) that lacks the built-in capability to implement retransmission (e.g., as is present in TCP). When using such an un-reliable transfer protocol, hashing to check for loss or corruption of data can be carried out, for example, above the protocol level at the level of the application that is waiting on the data (application layer). Given the teachings herein, the skilled artisan will be able to implement hashing or other techniques to detect errors, resulting in retransmission requests that can be handled in accordance with aspects of the invention.

Now continuing, in one or more embodiments, as part of multicast receiver registration, a second multicast group is joined that provides locally scoped (e.g., one service group or one CMTS) corrections for a plurality (or perhaps all) channels currently being received by that set of receivers, regardless of the original multicast group upon which they were transmitted. This second multicast group may be referred to as a "failure domain fill group." Furthermore in this regard, during multicast receiver registration, a multicast receiver joins a (first) multicast group for receiving multicast transmissions. The second multicast group that is joined is for purposes of receiving error corrections. By way of a non-limiting example, consider FIG. 4. One or more CPE serviced by local service node 1, one or more CPE serviced by local service node 2, and one or more CPE serviced by local service node n may all be part of the first multicast group (say, "Group A"), for receiving multicast transmissions. The one or more CPE serviced by local service node 1 that are in Group A may join, as their second multicast group, "Group B." The one or more CPE serviced by local service node 2 that are in Group A may join, as their second multicast group, "Group C." The one or more CPE serviced by local service node n that are in Group A may join, as their second multicast group, "Group D."

Also as part of multicast receiver registration, an address (which may or may not be the Source-specific multicast (SSM) source of the second stream (i.e., the corrections/fills) is provided to which requests for fills and/or corrections may be sent. One or more requests for fills from receivers that are part of the same failure domain fill group results in transmission of a single copy of the requested content on the second multicast group, where it can be received by all affected receivers, but not the whole world. For example, suppose there are three CPE serviced by local service node 1 that are in Group A; they have joined, as their second multicast group, "Group B." If one of these three CPE sends a fill request, the same will be transmitted to all three members of Group B but not to Group C or Group D.

When a multicast file receiver detects that a segment of a file is missing, it communicates the request for retransmission to a retransmission arbiter device in the network (this device can be on the server from which the multicast files originate or can be separate—see discussion of FIG. 8 below—more generally, the request for retransmission is directed to an error-correcting multicast apparatus). By way of example and not limitation, this request could travel by unicast UDP, an HTTP REST connection, sending on an upstream multicast group, or any other standard way of sending a small message across an IP network, either reliably or unreliably.

When the multicast transmitter receives a request for a retransmission, it can process that request in a several ways. In the simplest model, any retransmission can follow the multicast model described above. That is to say, one retransmission request triggers an immediate and/or automatic rebroadcast via multicast (on the assumption that one retransmission request means that at least some other hosts have been affected but have not sent a retransmission request yet)—basically a preemptive approach. In another approach, a specified number of unicast re-transmit requests must be received before the multicast rebroadcast goes out. In this way, an implementer can "tune" the solution to be optimized either for limiting bandwidth, or for limiting the impact of corrupted data on end devices.

In some instances, the retransmission arbiter device consolidates multiple identical, overlapping, or non-identical requests for retransmission (because multiple receivers detected the same error) into one retransmission action. It is worth noting at this point that the retransmission arbiter device 806, discussed further below, is a logic machine to determine how to respond to retransmission requests. It can (but need not) be located on the same device that originated the content (content server 804, discussed below), and has the logic to decide whether retransmissions should be immediate or delayed, as well as which scope (if more than one is available) should be used to get the retransmission to the correct subset of devices.

In some cases, the above-described mechanism is replicated hierarchically. In this aspect, wider-area errors are appropriately handled on a second (wide area) multicast fill group by collaboration between a plurality of retransmission arbiter devices. Furthermore, in this aspect, in addition to the original content source, one or more retransmission sources are also provided. For example, each RDC 1048 can be provided with a regional retransmission source (RRS) 851; each head end 150 can be provided with a local retransmission source (LRS) 853. LRS 853 can be located, in a non-limiting example, on LAN 158 in head end 150. Note that content server 1054 is, in the general case, different than content server 804. Note also that RRS 851 could be located on the same physical and/or virtual machine as content server 1054 or one of the other servers in RDC 1048, if desired.

Now continuing, by way of example, the n second multicast groups of local service nodes 1 to n serviced by fiber node 178 may be joined into a superset and if the same error is noted from service nodes 1 and 2, retransmission may be to the superset, i.e., all n local service nodes serviced by fiber node 178. Retransmission to all local service nodes serviced by the same fiber node (or by the same CMTS) may come from LRS 853 in the corresponding head end 150. Retransmission of a broader scope may come from RRS 851. In general, where retransmission sources are provided, retransmission should preferably happen as locally to the error as possible to avoid over-retransmission, but far enough up in the hierarchy so that multiple devices don't have to carry out the same retransmission. It is also worth noting that some embodiments might not include RRS 851 due to the high network reliability at the RDC level. On the other hand, some embodiments will include RRS 851 since even though an error is unlikely, it would impact a large number of end users. Device 806, discussed further below, may also include logic to determine which retransmission source should undertake the retransmission.

One or more embodiments are of use, for example, where multicast techniques are employed for file distribution. The skilled artisan will appreciate that in this context, multicast is used for streaming video, not in the manner that HTTP is used to stream to an individual tablet or similar device, but, in essence, as an alternative to distribute video around a network when the video is primarily linear. It is worth noting that, in one or more embodiments, although the distribution method is linear, the video is consumed by multiple users at the same time, not time-shifted or on-demand. Multicast distribution is typically not beneficial for time-shifted video because of the statistical unlikelihood that multiple users are consuming a given piece of video content simultaneously and synchronously (in other words, watching the same point in the same content at the same time).

In using multicast, one benefit of undertaking replication as the network is traversed is bandwidth savings. However, when considering multicast techniques for less traditional file distribution applications (for example, use of multicast to distribute HLS video), a number of challenges are encountered. One significant challenge in this context is error handling. In many current cases, the protocol is designed to tolerate a certain amount of errors. For example, the video CODEC can handle a certain number of lost frames before visual artifacts are noted. In other current cases, additional overhead is added in the form of error correction, to compensate for the lost data. However, it is typically not possible with something like streaming video to go back and send corrections later, because, unless deep buffering is being carried out, the moment when the lost data is needed passes by rapidly.

One non-limiting exemplary application of one or more embodiments is to "spray" files non-linearly. For example, consider a CDN (Content Distribution Network) where it is required to pre-load a number of files so as to be able to serve them out later when customers start requesting them.

A CDN is a group of devices in the network that undertake local service of content—for example, a server with a copy of a number of interesting files (a specific definition of CDN is provided elsewhere herein). When a user requests the files, typically through DNS or the like, the CDN redirects the user to the closest server to the user so that this closest server serves the content to the user over the shortest distance. This typically results in the use of the least amount of network resources, taking advantage of the proximity to provide a good customer experience. A CDN also allows for scaling-up of distribution, because it is not necessary to have huge centralized server farms to provide large amounts of the same content to multiple users. CDNs are used extensively in video distribution but are also used for other content; for example, localizing web page delivery and the like.

Currently, the above-discussed pre-load of a number of files via a CDN is typically carried out via unicast. These kinds of files must be complete when transferred. Therefore, if pieces are lost or corrupted in transit, the end host will have to ask for retransmission. In current multicast solutions, most existing systems either use (i) a unicast backchannel to request retransmission and then the server re-sends the missing or corrupted portions as unicast, not multicast, or (ii) a unicast backchannel to request retransmission and then the server multicasts the missing or corrupted portions to everybody (i.e., all members of the original multicast group).

In contrast, one or more embodiments leverage the network construction and topology to address the issue more intelligently.

Hierarchical Nature of Exemplary HFC Network:

Consider an average cable network. There are different places where there is a greater likelihood of error(s) and there are different places where error(s) are more likely to be shared among multiple devices. As the network is traversed from "head to tail," consider that many parts of the network are all fiber, and thus the likelihood of error(s) is lower than for coaxial portions. However, if error(s) do occur in these fiber portions, they will impact a much larger subset of end destinations, because the fiber regions are prior to much of the replication that takes place in the network. When travelling further down into the network on an individual head end or node, there are places where the network is still fiber, so there is also less risk of packet loss to occur because of the reliability of fiber. When transferring to the copper (e.g., transfer from fiber to coaxial at node 178 in FIG. 4), transmissions are much more susceptible to interference or other problems and there may be a local subset of customers with significant errors. For example, these could be customers serviced by the same local node 182, fiber node 178, or CMTS 156.

Thus, customers on the same set of wires are likely to experience the same errors.

When a request for retransmission is obtained from one of those customers, one or more embodiments assume that devices on the same "wire" (e.g., same local node 182, fiber node 178, or CMTS 156) will need a re-transmission. In response, one or more embodiments carry out a locally-scoped re-transmission. In one or more embodiments, instead of prior art unicasts at different times, which waste bandwidth, another multicast group is added. Suppose there are three multicast groups representing Local Node 1, Local Node 2, and Local Node n. Local Node 1 has an error, while Local Node 2 and Local Node n do not. One or more embodiments only undertake the re-transmission to the multicast group associated with Node A, so that all the devices likely to have been impacted by that error will obtain a re-transmission. If the re-transmission is not needed in a particular case, it can be dropped. For example, suppose for Local Service Node 1, only CPE 1 and CPE n experienced the error; CPE 2 did not. CPE 2 can drop the re-transmission. The process just described allows advantage to be taken of the statistical likelihood that more than just the one host (e.g., CPE or receiver) that requested the retransmission was affected.

In case of a situation where Local Node 1 and Local Node 2 both had the same error, it is possible to re-transmit to both of the corresponding multicast groups; different groups can be defined for different hierarchies within the network. Hierarchical boundaries can be identified where re-transmission will or will not be undertaken based on the assumption that some number of users in that hierarchical boundary have experienced the error and therefore need the re-transmission. For example, in the case just described wherein Local Node 1 and Local Node 2 both had the same error, rather than merely retransmitting to just Local Node 1 and Local Node 2, it may be appropriate to retransmit to Local Nodes 1 to n since it may be likely that the error experienced by both Local Node 1 and Local Node 2 is at the level of fiber node 178.

Thus, it will be appreciated that logical groupings for multicasting re-transmissions responsive to errors include, from smallest to largest:

1. all customers who are part of the original multicast and who are served by a single local service node 182;
2. all customers who are part of the original multicast and who are served by a single fiber node 178;
3. all customers who are part of the original multicast and who are served by a single CMTS 156;
4. all customers who are part of the original multicast and who are served by a single head end 150; and
5. all customers who are part of the original multicast and who are served by a single RDC 1048.

In one or more embodiments, the next highest logical grouping, at the NDC level, is provided if the content is originated at a level of hierarchy above the NDC level; otherwise, the NDC level is, in essence, an "all receivers" case because the error occurred at the source.

Thus, advantageously, one or more embodiments provide a more granular error correction approach than the "brute force" method of multicasting the re-transmission to the entire original group, while realizing efficiency and bandwidth savings via granular use of multicast.

It will be appreciated that the lower numbered groups form subsets of the higher numbered groups. For example, an RDC includes all nodes, CMTS-es, and head ends in the region. When retransmission is made to the multicast group associated with the RDC, it is made to everything below. In working down the hierarchy, re-transmissions are progressively smaller and more granular regarding the number of hosts for which the re-transmission is being undertaken.

Consider how to determine what to include in each multicast group for re-transmission. In one or more embodiments, observe a level of correlation on re-transmit requests and determine what actions to take based on the network hierarchy. In one non-limiting exemplary embodiment, to determine which multicast group(s) to send the corrections to, initially respond only to the smallest possible multicast group—for example, all the devices that are served by a certain local service node. Then, if another error of that type is obtained from a different local service node within the same fiber node, send the correction(s) to all devices serviced by that fiber node. Then, if another error of that type is obtained from a different fiber node serviced by the same CMTS, send the correction(s) to all devices serviced by that CMTS. Then, if another error of that type is obtained from a different CMTS in the same head end, send the correction(s) to all devices serviced by that head end. This non-limiting exemplary embodiment will typically be carried out, as to retransmission scope, without reference to a clock—simply look at retransmission requests for the same data and where they originate from.

In another non-limiting exemplary embodiment, wait to carry out the re-transmission for an arbitrary but short length of time, to determine whether additional requests for correction are obtained. Then, make a decision about where to re-transmit, based on information available at end of that time period. For example, wait 150 milliseconds (150 milliseconds is an exemplary non-limiting value, and other values can be used in other embodiments—comments on how to select a suitable value are provided elsewhere herein) and if another retransmission request is received in that time, take it into account in determining how wide the scope of the retransmission multicast should be. For example, if you wait 150 milliseconds and another retransmission request is not received, just send the retransmission to all the devices that are served by the local service node from which the first retransmission request was received. On the other hand, if, within the 150 milliseconds:

another error of that type is obtained from a different local service node within the same fiber node, send the correction(s) to all devices serviced by that fiber node;

another error of that type is obtained from a different fiber node serviced by the same CMTS, send the correction(s) to all devices serviced by that CMTS;

another error of that type is obtained from a different CMTS in the same head end, send the correction(s) to all devices serviced by that head end, and so on.

The difference between the first embodiment and the second—a configurable time limit—allows the implementer to trade off bandwidth savings and better correlation against more immediate pre-emptive response.

Accordingly, it will be appreciated that in one or more embodiments, logic is provided (for example, on the apparatus 802 optionally including server 804 and/or arbiter device 806 thereof); the logic is programmed to wait a certain time after receiving the first request for retransmission. If no other requests come in before the predetermined time expires, assume that only the smallest multicast group associated with the error needs the re-transmission; if other requests for re-transmission come in, evaluate which multicast group(s) should receive the re-transmission. This dynamic allocation of the size of the group to receive the correction is significant in one or more embodiments—it is possible to size up or down as needed.

As discussed above, some embodiments use hashes to identify when data has been corrupted or lost. Alternate approaches use forward error correction.

One or more embodiments are useful in a variety of applications where files are to be distributed via multicast but where errors cannot be tolerated. One non-limiting example includes pre-segmented files for ultimate consumption by devices that are to consume HLS video. Consider pre-loading files onto a CDN for distribution. Such a CDN is not necessarily a traditional one residing somewhere inside the MSO network. In some instances, multiple levels of CDN are involved. For example, there may be a CDN at the head end and even a CDN in the customer's location. For example, video files may be pre-loaded onto a DVR 228 for local consumption. Some embodiments are therefore of interest even down at the node or individual customer level. Furthermore, one or more embodiments are not limited to distribution of video files (although this is an advantageous application). One or more embodiments can be employed wherever reliable transport, which need not be real-time in nature, is useful. Non-limiting examples include sending new software, new firmware, or a new operating system to an STB or cable modem or router; providing a software update for a PC; or the like—indeed, wherever a large subset of the same devices are present in a network such that the same software or other files are to be distributed among them simultaneously—wherever the inherent benefit of multicast rather than a large number (e.g., hundreds) of simultaneous unicast streams can be realized.

As used herein, a CDN is defined as a large distributed system of servers deployed in multiple data centers across a network, with the goal to serve content to end-users with high availability and high performance, from topologically proximate servers.

Furthermore in this regard, the skilled artisan will appreciate that multicast is typically used where reliability is not needed (gaps in the file can be tolerated) or where additional unicast functionality is available to handle typical aspects of reliable transport such as over a TCP stream. TCP over multicast typically only works where there is some way to manage the acknowledgements (ACKS) and so a typical approach is to employ UDP over multicast and if data does not go through simply assume that the data was not important anyway. Here, consider how to deal with transmission if it is desired to utilize a reliable protocol such as TCP. Sometimes, the ACKS are ignored or they are not sent back at all. Most current reliable multicast implementations are focused on negative ACKS only. That is to say, re-transmits are requested only when an intended recipient did not receive something. These approaches typically rely on sequencing to know when they missed something. However, rather than acknowledging every packet before the next one is sent, one or more of these approaches assume it was received unless a request for retransmission is received. In contrast, one or more embodiments assume that no ACKs or NACKs are employed because an unreliable transport protocol is being utilized—the retransmission requests arise apart from the transport protocol (see discussion of hashing at application level elsewhere herein). Thus one or more embodiments provide reliable multicasting using an unreliable transport protocol.

Again, one or more embodiments are useful in a variety of contexts; for example, when it is desired to carry out reliable file distribution by multicast in any kind of a network (HFC is a non-limiting example) where, when a failure occurs, some kind of logical inference can be made about some sub-group of the original multi-cast that has likely also had a failure. Then, undertake a second multicast to a subset of the first multicast, which has likely also had a failure, to correct the error. In the non-limiting example of an HFC plant, observe that there are different likelihoods of error within the network. On the fiber part, the statistical likelihood of error is typically about an order of magnitude lower than on the copper (e.g., coaxial) part. This observation is useful because it is possible to control the granularity (scope) of retransmission so as not to waste bandwidth by retransmitting to endpoints that are not likely to have seen the error.

As noted, in some embodiments, wait a predetermined time period Delta T after a first request for retransmission is received to determine how to proceed. The appropriate value for Delta T depends on the type of traffic or file being transferred. If the file receipt is not delay-sensitive, i.e. not being consumed in near real-time, it is appropriate to wait a relatively long time. However, if near real-time functionality is of interest, only wait a short period of time, especially where a buffer is being employed (say, 150-200 milliseconds), otherwise the time window where the retransmit is useful will be exceeded. Consider HLS with a 1-2 second buffer to allow error correction and detection before play-out. In such a case, it may only be appropriate to wait 150-200 milliseconds. On the other hand, if a software update is being undertaken, where real-time is not required, it might be appropriate to wait a minute or more, because waiting that long will not harm the file transfer. Furthermore in this regard, software upgrades, rather than being consumed in near real time (in contrast to the 1-2 second play-out buffer discussed just above) are typically of the form "transfer must complete before X date Y time" and thus delays in retransmission and file completion on the order of minutes or even hours are not a problem as long as the transfer protocols are configured not to time out and declare the transfer failed before that retransmission request is completed.

One or more embodiments are implemented, at least in part, in software on one or more servers that are located where the main multicast stream originates (in the non-limiting example of the network of FIGS. 1-4, in NDC 1098). In some cases, CDN servers could also be more localized within a regional network served by RDC 1048 or even a local network. For example, a CDN could be located at a head end, fiber node, or even a local service node in Austin, Tex. or part of an NDC in Denver, Colo. or Charlotte, N.C. CDNs are typically implemented via commodity servers with additional software to help manage coordination of the content. Large numbers of high-capacity fast disks are also typically employed. As noted, in some embodiments, a content server 804 is located in the NDC 1098 and retransmission servers 851, 853 are located downstream.

Figure 7:
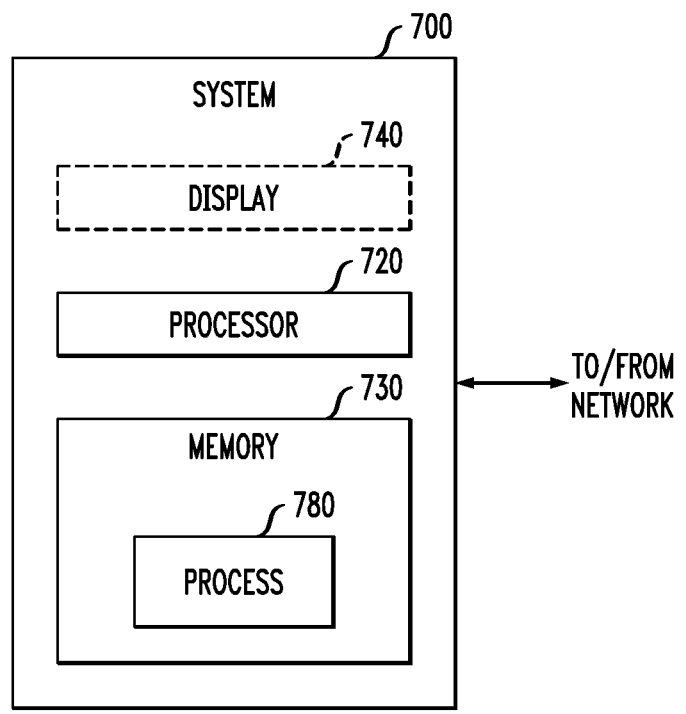
FIG. 7 is a block diagram of a computer system useful in connection with one or more aspects of the invention.
Figure 8:
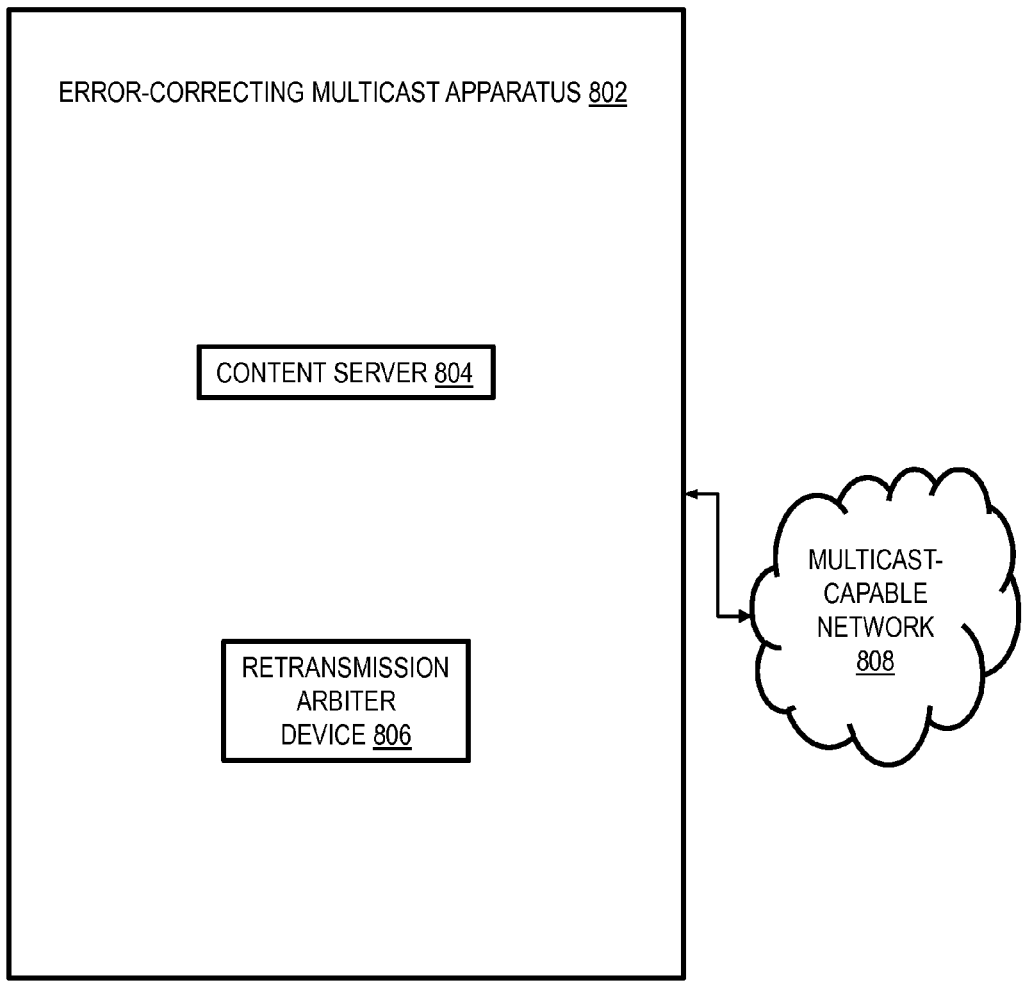
FIG. 8 is a block diagram of an exemplary error-correcting multicast apparatus, in accordance with an aspect of the invention.

FIG. 8 shows an exemplary error-correcting multicast apparatus 802 coupled to a multicast-capable network 808 (any network with multicast-capable routers and switches; the network of FIGS. 1-4 is a non-limiting example). The apparatus 802 includes one or more content servers 804 and a retransmission arbiter device 806. The content server(s) 804 will always include one or more physical servers (e.g., 700 in FIG. 7) and may or may not be virtualized via a hypervisor or the like. In some cases the content server(s) 804 and retransmission arbiter device are separate and have separate addresses (but are in communication with each other via a network or the like) and in other cases they are combined on a single physical or virtual device and have the same address. In one or more embodiments, the content server(s) 804 will be variants on web servers. In the video distribution example, HTTP live streaming can be employed, with a web server tightly optimized for HTTP live streaming. In the case of software distribution, a web server, File Transfer Protocol (FTP) server, Trivial File Transfer Protocol (TFTP) server, or the like can be employed. Similar comments apply to RRS 851 and LRS 853. The retransmission arbiter device 806, as noted, is a logic machine to determine how to respond to retransmission requests. It has the logic, discussed elsewhere herein, to decide whether retransmissions should be immediate or delayed, as well as which scope (if more than one is available) should be used to get the retransmission to the correct subset of devices. Where RRS 851 and/or LRS 853 are employed, retransmission arbiter device 806 includes logic to determine which should be used for retransmission (based, e.g., on topological proximity as discussed elsewhere herein).

Consider, e.g., software (SW) distribution for software used on set-top boxes, routers, cable modems, and the like. On one or more embodiments, modifications in accordance with aspects of the invention are made with respect to the client software responsible for pulling down the software updates. The client SW should be configured to accept a file over multicast and to be cognizant of the fact that, when a retransmit request is sent, a retransmit may not be received right away. Consider unmodified TCP—a retransmit request is sent, and if a timer expires after some fairly short period of time, another retransmit request will be sent, or the system will give up. In one or more embodiments, client-side software is modified to send a retransmit request and then be willing to wait for the predetermined Delta T, as discussed above, that the network device (e.g., apparatus 802 optionally with server 804 and/or device 806) waits before it decides what to do. In one or more embodiments, the client-side software is also configured to know what to do when it receives a retransmit that it did not ask for (e.g., to either discard the retransmit because the retransmit is not needed or to accept the retransmit because it (that instance of the client-side SW) has the same problem.

Consider how long the client-side software should wait before re-sending the re-transmission request. Some embodiments employ a failsafe timeout window, wherein, if the client-side software does not hear from the server in a certain time, the retransmit request is re-sent. Alternatively, a negotiated value can be employed, based on what the content is. A value for live streaming will be lower than a value used when sending a software update. Thus, one or more embodiments provide a suitable mechanism or logic in the SW to negotiate a value, or a "set it as you go" approach can be employed.

Thus, one or more embodiments include software at the server 804 serving out the content (and/or in communication with same such as on device 806) and/or modifications to the client-side SW (e.g., stored in memory 310) to enable it to participate.

It is worth noting that in one or more embodiments, nodes which receive a retransmission for error correction, but do not need the retransmitted data because they have received the original transmission intact, will simply drop the duplicate data.

It is also worth noting that one or more embodiments provide retention and correlation of retransmission requests to aid in troubleshooting of the underlying error cause. In other words, if, from examining the system, it is determined that a large number of retransmission requests are coming in from nodes in group B over some unit time, it can be concluded that a potential problem, localized to this area, should be investigated further by those responsible for the underlying transport network. This information, especially if combined with a timestamp, is also useful in tuning the delay time—if a delay timer is set to 150 ms, and a retransmission request for the same packet is routinely received at 152 ms, it may be worth increasing the timer to 160 ms. The reverse is also true (e.g., suppose a retransmission request is never obtained that is further than 100 ms different from the first one)—this might allow the timer to be decreased. This approach can also be implemented algorithmically as a sliding window that is incremented or decremented based on the duration between the first and subsequent retransmission requests.

Given the discussion thus far, it will be appreciated that, in general terms, an exemplary method, according to an aspect of the invention, includes the step of multicasting a file from an error-correcting multicast apparatus 802 (e.g., in NDC 1098) to a plurality of endpoints (e.g., CPE 106). The endpoints are the members of a first multicast group. The file is multicast over a network (the HFC network of FIGS. 1-4 is a non-limiting example) segmented into at least second and third multicast groups (e.g., failure domain fill groups as discussed above). The second and third multicast groups are subsets of the first multicast group. Given ones of the endpoints are assigned to the second and third multicast groups based on likelihood of experiencing similar errors (e.g., due to variable reliability and/or hierarchical topology as discussed elsewhere herein). For example, the second multicast group could be all the CPE serviced by local service node (1) and the third multicast group could be all the CPE serviced by local service node (2) in FIG. 4. Given the teachings herein, the skilled artisan will be able to assign endpoints to failure domain fill groups based on loss characteristics that can be grouped together given network topology or similar criteria. Thus, one or more embodiments are useful in networks where some inference can be drawn regarding which other endpoints may have experienced the same error. In the exemplary and non-limiting example of FIGS. 1-4, these were set forth at points 1-4 above.

Note that the file to be multicast can be any kind of file where reliable delivery is required; a pre-segmented file for HLS video is a non-limiting example.

Another step includes obtaining, at the error-correcting multicast apparatus 802, over the network, a retransmission request from a first one of the endpoints. The retransmission request arises due to loss and/or corruption of a portion of the file during the multicasting of the file to the first one of the endpoints. The retransmission request is sent by a software component on an endpoint (e.g., CPE such as an STB) and obtained by the apparatus 802 (typically, the retransmission arbiter device 806); non-limiting examples of how to send the retransmission request have been given above.

A further step includes retransmitting the portion of the file, via multicasting, over the network, to the second multicast group or the third multicast group. The retransmission may be from the server 804 of the apparatus 802 or from RRS 851 or LRS 853.

As an aside, it is worth noting that some prior art reliable multicast techniques assume that everything is received unless a NACK is received and do not require every packet to be acknowledged as in TCP. As noted, one or more embodiments assume that no ACKs or NACKs are employed because an unreliable transport protocol is being utilized—the retransmission requests arise apart from the transport protocol (see discussion of hashing at application level elsewhere herein). Thus one or more embodiments provide reliable multicasting using an unreliable transport protocol.

In some cases, the retransmitting is to that one of the second and third multicast groups which includes the first one of the endpoints (from which the retransmission request came) but not to the other of the second and third multicast groups (i.e., not to the one from which the retransmission request did not come).

In some embodiments, the network comprises a content distribution network, such that the multicasting of the file includes multicasting the file over the content distribution network; the obtaining of the retransmission request includes obtaining the retransmission request over the content distribution network; and the retransmitting of the portion of the file includes retransmitting the portion of the file over the content distribution network.

In some instances, the content distribution network comprises a hybrid fiber-coaxial network, such that the multicasting of the file includes multicasting the file over the hybrid fiber-coaxial network; the obtaining of the retransmission request includes obtaining the retransmission request over the hybrid fiber-coaxial network; and the retransmitting of the portion of the file includes retransmitting the portion of the file over the hybrid fiber-coaxial network.

Again, for the avoidance of doubt, an HFC CDN is one non-limiting use case; there are many uses for reliable multicasting outside of a CDN environment.

As discussed above, variability (of reliability) is one use case; another is hierarchy. HFC networks have both. One or more embodiments are of interest in either or both cases.

As noted, an HFC network is one non-limiting example of a network that can benefit from aspects of the invention. Thus, in some instances, further steps include assigning a first subset of the endpoints to the second multicast group based on service by a first local service node (e.g., local service node (1) in FIG. 4) and assigning a second subset of the endpoints to the third multicast group based on service by a second local service node (e.g., local service node (2) in FIG. 4).

As also noted, a hierarchical approach is employed in one or more embodiments. Thus, in some instances, the network is further segmented into at least fourth and fifth multicast groups (e.g., all endpoints connected to fiber node 178 could be the fourth multicast group and all endpoints connected to another fiber node could be the fifth multicast group). The fourth and fifth multicast groups are subsets of the first multicast group. The second and third multicast groups are subsets of the fourth multicast group. Given ones of the endpoints are assigned to the fourth and fifth multicast groups based on likelihood of experiencing similar errors. In this aspect, additional steps include assigning a third subset of the endpoints to the fourth multicast group based on service by a first fiber node (e.g. node 178); and assigning a fourth subset of the endpoints to the fifth multicast group based on service by a second fiber node (not shown but would be similar to fiber node 178 and connected to the fiber network in FIG. 4). Still further steps include obtaining, at the error-correcting multicast apparatus, over the network, a retransmission request from a second one of the endpoints, based on loss and/or corruption of a portion of the file during the multicasting of the file to the second one of the endpoints; and retransmitting the portion of the file, via multicasting, over the network, to that one of the fourth and fifth multicast groups which includes the second one of the endpoints but not to that one of the fourth and fifth multicast groups which does not include the second one of the endpoints.

In some instances, the network is further segmented into at least sixth and seventh multicast groups. For example, the sixth multicast group could correspond to all endpoints serviced by CMTS 156 in FIG. 3, including those served by the aforementioned fiber nodes and local nodes. The seventh multicast group could correspond to all endpoints serviced by another CMTS (not shown in FIG. 3) located in the same head end 150 as CMTS 156. The sixth and seventh multicast groups are subsets of the first multicast group. The fourth and fifth multicast groups are subsets of the sixth multicast group. Given ones of the endpoints are assigned to the sixth and seventh multicast groups based on likelihood of experiencing similar errors. In this aspect, additional steps include assigning a fifth subset of the endpoints to the sixth multicast group based on service by the first cable modem termination system 156; and assigning a sixth subset of the endpoints to the seventh multicast group based on service by a second cable modem termination system (e.g., another CMTS (not shown in FIG. 3) located in the same head end 150 as CMTS 156, as just discussed). Further steps include obtaining, at the error-correcting multicast apparatus, over the network, a retransmission request from a third one of the endpoints, based on loss and/or corruption of a portion of the file during the multicasting of the file to the third one of the endpoints; and retransmitting the portion of the file, via multicasting, over the network, to that one of the sixth and seventh multicast groups which includes the third one of the endpoints but not to that one of the sixth and seventh multicast groups which does not include the third one of the endpoints.

In some cases, the network is even further segmented into at least eighth and ninth multicast groups. For example, the eighth multicast group could correspond to all endpoints serviced by head end 150 in FIG. 4, including those served by the aforementioned cable modem termination systems, fiber nodes and local nodes. The ninth multicast group could correspond to all endpoints serviced by another head end (see FIG. 1) located in the same region as head end 150 in FIG. 4 (see the two head ends shown in FIG. 1). The eighth and ninth multicast groups are subsets of the first multicast group. The sixth and seventh multicast groups are subsets of the eighth multicast group. Given ones of the endpoints are assigned to the eighth and ninth multicast groups based on likelihood of experiencing similar errors. In this aspect, additional steps include assigning a seventh subset of the endpoints to the eighth multicast group based on service by the first head end 150 in FIG. 4; assigning an eighth subset of the endpoints to the ninth multicast group based on service by a second head end (e.g., as just discussed, another head end (see FIG. 1) located in the same region as head end 150 in FIG. 4 (see the two head ends shown in FIG. 1)). Further steps include obtaining, at the error-correcting multicast apparatus, over the network, a retransmission request from a fourth one of the endpoints, based on loss and/or corruption of a portion of the file during the multicasting of the file to the fourth one of the endpoints; and retransmitting the portion of the file, via multicasting, over the network, to that one of the eighth and ninth multicast groups which includes the fourth one of the endpoints but not to the other of the eighth and ninth multicast groups which does not include the fourth one of the endpoints.

In some cases, the network is yet further segmented into at least tenth and eleventh multicast groups. For example, the tenth multicast group could correspond to all endpoints serviced by RDC 1048 in FIG. 1, including those served by the aforementioned head ends, cable modem termination systems, fiber nodes and local nodes. The eleventh multicast group could correspond to all endpoints serviced by another RDC (not shown in the figures but would be similar to RDC 1048 in FIG. 1.). The tenth and eleventh multicast groups are subsets of the first multicast group, and the eighth and ninth multicast groups are subsets of the tenth multicast group. Given ones of the endpoints are assigned to the tenth and eleventh multicast groups based on likelihood of experiencing similar errors. In this aspect, additional steps include assigning a ninth subset of the endpoints to the tenth multicast group based on service by the first regional data center 1048; assigning a tenth subset of the endpoints to the eleventh multicast group based on service by a second regional data center (as discussed, not shown); obtaining, at the error-correcting multicast apparatus, over the network, a retransmission request from a fifth one of the endpoints, based on loss and/or corruption of a portion of the file during the multicasting of the file to the fifth one of the endpoints; and retransmitting the portion of the file, via multicasting, over the network, to that one of the tenth and eleventh multicast groups which includes the fifth one of the endpoints but not to the other of the tenth and eleventh multicast groups which does not include the fifth one of the endpoints.

Recall that the general exemplary method discussed above, includes the step of multicasting a file from a content server (e.g., a server 700 in NDC 1098) to a plurality of endpoints (e.g., CPE 106). The endpoints are the members of a first multicast group, and the file is multicast over a network (the network of FIGS. 1-4 is a non-limiting example) segmented into at least second and third multicast groups (e.g., failure domain fill groups as discussed above). In some cases, the network is further segmented into at least a fourth multicast group, which is a subset of the first multicast group. Given ones of the endpoints are assigned to the fourth multicast group based on likelihood of experiencing similar errors. Further steps in some such cases include waiting a predetermined period of time after obtaining the retransmission request from the first one of the endpoints; and obtaining a retransmission request from a second one of the endpoints. The retransmitting step is carried out after expiration of the predetermined period of time and further includes retransmitting the portion of the file, via multicasting, over the network, to the fourth multicast group. The second one of the endpoints is in the fourth multicast group. For example, as discussed above, the second multicast group could be all the CPE serviced by local service node (1) and the third multicast group could be all the CPE serviced by local service node (2) in FIG. 4. The fourth multicast group could be, for example, all the CPE serviced by fiber node 178 in FIG. 4.

In some circumstances, a further step includes setting the predetermined period of time based on the content type of the file. For example, base the time on the requirement as to when the application will experience a time out. In video streaming, the retransmit should be received before running out of play-out buffer; otherwise, the frame will be lost and result in a glitch. In a SW push, since not consumption is not in real time or near real time, it is possible to wait much longer before declaring a fail.

Thus, in some circumstances (e.g., when the file is not needed in near-real-time), a further step includes setting the predetermined period of time as at least one minute. This value is exemplary and non-limiting, and other values could be used when the file is not needed in near-real-time or when the file is needed in near-real-time.

Further, in some circumstances (e.g., when the file is needed in near-real-time), a further step includes setting the predetermined period of time as no more than 200 milliseconds. This value is exemplary and non-limiting, and other values could be used when the file is not needed in near-real-time or when the file is needed in near-real-time.

The value can be arbitrary or can be dependent on the play-out buffer considering round trip time of any retransmission request and receipt of that retransmission.

Again, recall that the general exemplary method discussed above, includes the step of multicasting a file from a content server (e.g., a server 700 in NDC 1098) to a plurality of endpoints (e.g., CPE 106). The endpoints are the members of a first multicast group, and the file is multicast over a network (the network of FIGS. 1-4 is a non-limiting example) segmented into at least second and third multicast groups (e.g., failure domain fill groups as discussed above). In some cases, a further step includes obtaining, at the error-correcting multicast apparatus, over the network, at least a second retransmission request from the first one of the endpoints (again, based on loss and/or corruption of the portion of the file during the multicasting of the file to the first one of the endpoints). In this aspect, the retransmitting step is only carried out after obtaining the at least second retransmission request.

Recall that the general exemplary method discussed above, includes the step of multicasting a file from a content server (e.g., a server 700 in NDC 1098) to a plurality of endpoints (e.g., CPE 106). The endpoints are the members of a first multicast group, and the file is multicast over a network (the network of FIGS. 1-4 is a non-limiting example) segmented into at least second and third multicast groups (e.g., failure domain fill groups as discussed above). In some cases, the network is further segmented into at least a fourth multicast group, which is a subset of the first multicast group. Given ones of the endpoints are assigned to the fourth multicast group based on likelihood of experiencing similar errors. In some such cases, the retransmission of the portion of the file to the one of the second and third multicast groups is carried out responsive to the obtaining of the retransmission request from the first one of the endpoints, without further triggering, and further steps include obtaining a retransmission request from a second one of the endpoints; and, responsive to the obtaining of the retransmission request from the second one of the endpoints, retransmitting the portion of the file, via multicasting, over the network, to the fourth multicast group. The second one of the endpoints is in the fourth multicast group.

Regarding the terminology "responsive to" and "without further triggering"—in one or more embodiments meeting these limitations, retransmission is with minimal delay—as opposed to the defined delay in the alternative embodiment. Retransmission is carried out as soon as the request is received without requiring the expiration of a clock or other further trigger—the only trigger is the initial retransmit request, and action is taken action based solely on that trigger.

Thus, the response to the retransmission request can be, for example, immediate; delayed by a predetermined time (after which an assessment is made as to what other retransmission requests have been received if any); or only sent after a second retransmission request for the same material is received from the same endpoint. In general, retransmission timing can be tuned to limit bandwidth or to limit impact to end devices.

In some instances, a multicast receiver registration procedure is carried out. In such a case, additional steps can include, for example, registering each of the endpoints into the first multicast group and one of the second and third multicast groups; and providing each of the endpoints with an address to send retransmission requests to. The retransmission request from the first one of the endpoints is sent to the provided address (e.g., retransmission arbiter device 806 which may be same as or different than server 804). This address may or may not be the source of the retransmission.

In another aspect, an exemplary error-correcting multicast apparatus 802 includes a memory 730; at least one processor 720 coupled to the memory; and a non-transitory persistent storage medium which contains instructions which, when loaded into the memory, configure the at least one processor to be operative to carry out or otherwise facilitate any one, some, or all of the method steps just described.

Given the discussion thus far, it will be appreciated that, in general terms, another exemplary method, according to another aspect of the invention, includes the step of, at one of a plurality of endpoints (e.g., CPE 106) comprising a first multicast group, receiving a multicast of a file from an error-correcting multicast apparatus to the first multicast group. The multicast of the file is received over a network segmented into at least second and third multicast groups (e.g., failure domain fill groups as discussed above). The second and third multicast groups are subsets of the first multicast group. Given ones of the endpoints are assigned to the second and third multicast groups based on likelihood of experiencing similar errors. For example, the second multicast group could be all the CPE serviced by local service node (1) and the third multicast group could be all the CPE serviced by local service node (2) in FIG. 4.

A further step includes dispatching, to the error-correcting multicast apparatus, over the network, a retransmission request from the endpoint under consideration (the retransmission request is due to loss and/or corruption of a portion of the file during the multicasting of the file to the endpoint under consideration). An even further step includes receiving, at the endpoint under consideration, a retransmission of the portion of the file, via multicasting, from the error-correcting multicast apparatus, over the network, to one of the second and third multicast groups.

In some cases, in the step of receiving the retransmission, the retransmission is to that one of the second and third multicast groups which includes the endpoint from which the retransmission request came but not to the other of the second and third multicast groups (i.e., not to the one from which the retransmission request did not come).

In some instances, additional steps include receiving, at the endpoint under consideration, another retransmission not requested by the endpoint under consideration; determining, at the endpoint under consideration, that this other retransmission is not applicable to the endpoint under consideration; and, responsive to the determining, discarding the other retransmission.

In some instances, additional steps include receiving, at the endpoint under consideration, another retransmission not requested by the endpoint under consideration; determining, at the one of the endpoints, that this other retransmission is applicable to the endpoint under consideration; and, responsive to the determining, using the other retransmission to repair the file.

In some cases, if the retransmission of the portion of the file is not received at the endpoint under consideration within a predetermined failsafe timeout window, a further step includes, responsive to expiration of the predetermined failsafe timeout window, re-dispatching the retransmission request. The retransmission of the portion of the file is then received at the endpoint under consideration after the predetermined failsafe timeout window, responsive to the re-dispatched retransmission request.

In some instances a further step includes negotiating, with the error-correcting multicast apparatus, a predetermined timeout window based on content type of the file (e.g., short window for real-time or near-real-time video with a small buffer; long window for non-real-time computer program file distribution). In such a case, if the retransmission of the portion of the file is not received at the endpoint under consideration within the predetermined timeout window, a further step includes, responsive to expiration of the predetermined timeout window, re-dispatching the retransmission request. The retransmission of the portion of the file is then received at the endpoint under consideration after the predetermined timeout window, responsive to the re-dispatched retransmission request.

In another aspect, an exemplary multicast network endpoint (e.g., 106 or 700) is provided for use as one of a plurality of endpoints comprising a first multicast group, within a network (e.g., that of FIG. 1-4 or 808) segmented into at least second and third multicast groups. The second and third multicast groups are subsets of the first multicast group, and given ones of the endpoints are assigned to the second and third multicast groups based on likelihood of experiencing similar errors. The multicast network endpoint includes a memory 310 or 730; at least one processor 306 or 720 coupled to the memory; and a non-transitory persistent storage medium (e.g., 308) which contains instructions which, when loaded into the memory, configure the at least one processor to be operative to carry out or otherwise facilitate any one, some, or all of the method steps just described.

System and Article of Manufacture Details

The invention can employ hardware aspects or a combination of hardware and software aspects. Software includes but is not limited to firmware, resident software, microcode, etc. At least a portion of one or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, at least a portion of one or more embodiments of the invention or elements thereof can be implemented in the form of an apparatus including a memory and at least one processor that is coupled to the memory and operative to perform, or facilitate performance of, exemplary method steps.

Yet further, in another aspect, at least a portion of one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an application specific integrated circuit (ASIC) or field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, at least a portion of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700; processor 306 of CPE 106; or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that at least a portion of one or more embodiments of the invention can include a computer program comprising computer program code means adapted to perform one or all of the steps of any methods or claims set forth herein when such program is run, for example, on a content server 804, retransmission arbiter device 806, error-correcting multicast apparatus 802, end point such as CPE 106, and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. content server 804, retransmission arbiter device 806, LRS 853, RRS 851) and/or other components discussed herein. Multicasting can be carried out by the content server. Obtaining the retransmission request can be carried out by the retransmission arbiter device. Retransmission can be carried out by the content server 804, LRS 853, or RRS 851. On the client side, at least some embodiments include a receiver checker module in storage 308 which is loaded into memory 310 to configure the processor 306 to carry out the hash checking (so as to determine that loss and/or corruption has occurred); to determine how long to wait to send another retransmission request when a response to a first retransmission request is not received; to determine how to respond to a retransmission that was not requested, as described elsewhere herein; and to carry out other client-side functions, as described elsewhere herein. The receiver checker will create a manifest of needed retransmissions based on the hash checking. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that at least a portion of one or more embodiments of the invention can include a computer program including computer program code means adapted to perform one or all of the steps of any methods or claims set forth herein when such program is implemented on a processor, and that such program may be embodied on a tangible computer readable recordable storage medium. Further, at least a portion of one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
multicasting a file from an error-correcting multicast apparatus to a plurality of endpoints comprising a first multicast group, over a network segmented into at least second and third multicast groups, said second and third multicast groups being subsets of said first multicast group, given ones of said endpoints being assigned to said second and third multicast groups based on likelihood of experiencing similar errors;
obtaining, at said error-correcting multicast apparatus, over said network, a retransmission request from a first one of said endpoints, based on at least one of loss and corruption of a portion of said file during said multicasting of said file to said first one of said endpoints; and
retransmitting said portion of said file, via multicasting, over said network, to one of said second and third multicast groups.

2. The method of claim 1, wherein said retransmitting comprises retransmitting to one of said second and third multicast groups which includes said first one of said endpoints but not to another of said second and third multicast groups which does not include said first one of said endpoints.

3. The method of claim 2, wherein said network comprises a content distribution network, such that:
said multicasting of said file comprises multicasting said file over said content distribution network;
said obtaining of said retransmission request comprises obtaining said retransmission request over said content distribution network; and
said retransmitting of said portion of said file comprises retransmitting said portion of said file over said content distribution network.

4. The method of claim 3, wherein said content distribution network comprises a hybrid fiber-coaxial network, such that:
said multicasting of said file comprises multicasting said file over said hybrid fiber-coaxial network;
said obtaining of said retransmission request comprises obtaining said retransmission request over said hybrid fiber-coaxial network; and
said retransmitting of said portion of said file comprises retransmitting said portion of said file over said hybrid fiber-coaxial network.

5. The method of claim 4, further comprising:
assigning a first subset of said endpoints to said second multicast group based on service by a first local service node; and
assigning a second subset of said endpoints to said third multicast group based on service by a second local service node.

6. The method of claim 5, wherein said network is further segmented into at least fourth and fifth multicast groups, said fourth and fifth multicast groups being subsets of said first multicast group, said second and third multicast groups being subsets of said fourth multicast group, given ones of said endpoints being assigned to said fourth and fifth multicast groups based on likelihood of experiencing similar errors, further comprising the additional steps of:
assigning a third subset of said endpoints to said fourth multicast group based on service by a first fiber node;
assigning a fourth subset of said endpoints to said fifth multicast group based on service by a second fiber node;

obtaining, at said error-correcting multicast apparatus, over said network, a retransmission request from a second one of said endpoints, based on at least one of loss and corruption of a portion of said file during said multicasting of said file to said second one of said endpoints; and retransmitting said portion of said file, via multicasting, over said network, to one of said fourth and fifth multicast groups which includes said second one of said endpoints but not to another of said fourth and fifth multicast groups which does not include said second one of said endpoints.

7. The method of claim 6, wherein said network is further segmented into at least sixth and seventh multicast groups, said sixth and seventh multicast groups being subsets of said first multicast group, said fourth and fifth multicast groups being subsets of said sixth multicast group, given ones of said endpoints being assigned to said sixth and seventh multicast groups based on likelihood of experiencing similar errors, further comprising the additional steps of:

assigning a fifth subset of said endpoints to said sixth multicast group based on service by a first cable modem termination system;

assigning a sixth subset of said endpoints to said seventh multicast group based on service by a second cable modem termination system;

obtaining, at said error-correcting multicast apparatus, over said network, a retransmission request from a third one of said endpoints, based on at least one of loss and corruption of a portion of said file during said multicasting of said file to said third one of said endpoints; and retransmitting said portion of said file, via multicasting, over said network, to one of said sixth and seventh multicast groups which includes said third one of said endpoints but not to another of said sixth and seventh multicast groups which does not include said third one of said endpoints.

8. The method of claim 7, wherein said network is further segmented into at least eighth and ninth multicast groups, said eighth and ninth multicast groups being subsets of said first multicast group, said sixth and seventh multicast groups being subsets of said eighth multicast group, given ones of said endpoints being assigned to said eighth and ninth multicast groups based on likelihood of experiencing similar errors, further comprising the additional steps of:

assigning a seventh subset of said endpoints to said eighth multicast group based on service by a first head end;

assigning an eighth subset of said endpoints to said ninth multicast group based on service by a second head end;

obtaining, at said error-correcting multicast apparatus, over said network, a retransmission request from a fourth one of said endpoints, based on at least one of loss and corruption of a portion of said file during said multicasting of said file to said fourth one of said endpoints; and retransmitting said portion of said file, via multicasting, over said network, to one of said eighth and ninth multicast groups which includes said fourth one of said endpoints but not to another of said eighth and ninth multicast groups which does not include said fourth one of said endpoints.

9. The method of claim 8, wherein said network is further segmented into at least tenth and eleventh multicast groups, said tenth and eleventh multicast groups being subsets of said first multicast group, said eighth and ninth multicast groups being subsets of said tenth multicast group, given ones of said endpoints being assigned to said tenth and eleventh multicast groups based on likelihood of experiencing similar errors, further comprising the additional steps of:

assigning a ninth subset of said endpoints to said tenth multicast group based on service by a first regional data center;

assigning a tenth subset of said endpoints to said eleventh multicast group based on service by a second regional data center;

obtaining, at said error-correcting multicast apparatus, over said network, a retransmission request from a fifth one of said endpoints, based on at least one of loss and corruption of a portion of said file during said multicasting of said file to said fifth one of said endpoints; and retransmitting said portion of said file, via multicasting, over said network, to one of said tenth and eleventh multicast groups which includes said fifth one of said endpoints but not to another of said tenth and eleventh multicast groups which does not include said fifth one of said endpoints.

10. The method of claim 2, wherein said network is further segmented into at least a fourth multicast group, said fourth multicast group being a subset of said first multicast group, given ones of said endpoints being assigned to said fourth multicast group based on likelihood of experiencing similar errors, further comprising:

waiting a predetermined period of time after obtaining said retransmission request from said first one of said endpoints; and obtaining a retransmission request from a second one of said endpoints;

wherein said retransmitting step is carried out after expiration of said predetermined period of time and further comprises retransmitting said portion of said file, via multicasting, over said network, to said fourth multicast group, said second one of said endpoints being in said fourth multicast group.

11. The method of claim 10, further comprising setting said predetermined period of time based on content type of said file.

12. The method of claim 10, wherein said file is not needed in near-real-time, further comprising setting said predetermined period of time as at least one minute.

13. The method of claim 10, wherein said file is needed in near-real-time, further comprising setting said predetermined period of time as no more than 200 milliseconds.

14. The method of claim 10, further comprising;

obtaining, at said error-correcting multicast apparatus, over said network, a plurality of additional retransmission requests from additional ones of said endpoints, said retransmission requests being timestamped; and setting said predetermined period of time based on said timestamped retransmission requests.

15. The method of claim 2, further comprising obtaining, at said error-correcting multicast apparatus, over said network, at least a second retransmission request from said first one of said endpoints, based on said at least one of loss and corruption of said portion of said file during said multicasting of said file to said first one of said endpoints, wherein said retransmitting step is only carried out after said obtaining of said at least second retransmission request.

16. The method of claim 2, wherein:

said network is further segmented into at least a fourth multicast group, said fourth multicast group being a subset of said first multicast group, given ones of said endpoints being assigned to said fourth multicast group based on likelihood of experiencing similar errors; and said retransmitting of said portion of said file to said one of said second and third multicast groups is carried out responsive to said obtaining of said retransmission request from said first one of said endpoints, without further triggering;

further comprising:

obtaining a retransmission request from a second one of said endpoints; and responsive to said obtaining of said retransmission request from said second one of said endpoints, and without further triggering, retransmitting said portion of said file, via multicasting, over said network, to said fourth multicast group, said second one of said endpoints being in said fourth multicast group.

17. The method of claim 1, further comprising:

registering each of said endpoints into said first multicast group and one of said second and third multicast groups; and providing each of said endpoints with an address to send retransmission requests to, said retransmission request from said first one of said endpoints being sent to said address.

18. The method of claim 1, wherein:

said multicasting is carried out by a content server module, embodied on at least one non-transitory storage medium, executing on at least one hardware processor; and said obtaining is carried out by a retransmission arbiter device module, embodied on said at least one non-transitory storage medium, executing on said at least one hardware processor.

19. The method of claim 18, wherein said retransmitting is carried out by a retransmission source module, embodied on said at least one non-transitory storage medium, executing on said at least one hardware processor.

20. The method of claim 18, wherein said retransmitting is carried out by said content server module, embodied on said at least one non-transitory storage medium, executing on said at least one hardware processor.

21. The method of claim 1, further comprising:

obtaining, at said error-correcting multicast apparatus, over said network, a plurality of additional retransmission requests from additional ones of said endpoints; and troubleshooting said network based on said retransmission requests.

22. A method comprising the steps of:

at one of a plurality of endpoints comprising a first multicast group, over a network segmented into at least second and third multicast groups, said second and third multicast groups being subsets of said first multicast group, given ones of said endpoints being assigned to said second and third multicast groups based on likelihood of experiencing similar errors, receiving a multicast of a file from an error-correcting multicast apparatus to said first multicast group;

dispatching, to said error-correcting multicast apparatus, over said network, a retransmission request from said one of said endpoints, based on at least one of loss and corruption of a portion of said file during said multicasting of said file to said one of said endpoints; and receiving, at said one of said endpoints, a retransmission of said portion of said file, via multicasting, from said error-correcting multicast apparatus, over said network, to one of said second and third multicast groups.

23. The method of claim 22, wherein, in said step of receiving said retransmission, said retransmission is to one of said second and third multicast groups which includes said one of said endpoints but not to another of said second and third multicast groups which does not include said one of said endpoints.

24. The method of claim 23, further comprising:

receiving, at said one of said endpoints, another retransmission not requested by said one of said endpoints;

determining, at said one of said endpoints, that said another retransmission is not applicable to said one of said endpoints; and responsive to said determining, discarding said another retransmission.

25. The method of claim 23, further comprising:

receiving, at said one of said endpoints, another retransmission not requested by said one of said endpoints;

determining, at said one of said endpoints, that said another retransmission is applicable to said one of said endpoints; and responsive to said determining, using said another retransmission to repair said file.

26. The method of claim 23, wherein said retransmission of said portion of said file is not received at said one of said endpoints within a predetermined failsafe timeout window, further comprising, responsive to expiration of said predetermined failsafe timeout window, re-dispatching said retransmission request, wherein said retransmission of said portion of said file is received at said one of said endpoints after said predetermined failsafe timeout window, responsive to said re-dispatched retransmission request.

27. The method of claim 23, further comprising negotiating, with said error-correcting multicast apparatus, a predetermined timeout window based on content type of said file;

wherein said retransmission of said portion of said file is not received at said one of said endpoints within said predetermined timeout window;

further comprising, responsive to expiration of said predetermined timeout window, re-dispatching said retransmission request;

wherein said retransmission of said portion of said file is received at said one of said endpoints after said predetermined timeout window, responsive to said re-dispatched retransmission request.

28. The method of claim 22, further comprising determining, with a receiver checker module, embodied on at least one non-transitory storage medium, executing on at least one hardware processor of said one of said endpoints, that said at least one of loss and corruption of said portion of said file during said multicasting of said file to said one of said endpoints has occurred.

29. An error-correcting multicast apparatus comprising:

a memory;

at least one processor coupled to said memory; and a non-transitory persistent storage medium which contains instructions which, when loaded into said memory, configure said at least one processor to be operative to:

segment a network into second and third multicast groups that are subsets of a first multicast group comprising a plurality of endpoints, given ones of said endpoints being assigned to one of said second and third multicast groups based on likelihood of experiencing similar errors, multicast a file from said error-correcting multicast apparatus over said network to said first multicast group;

obtain, over said network, a retransmission request from a first one of said endpoints, based on at least one of loss and corruption of a portion of said file during said multicasting of said file to said first one of said endpoints; and retransmit said portion of said file, via multicasting, over said network, only to one of said second and third multicast groups corresponding to said first one of said endpoints.

30. A multicast network endpoint for use as one of a plurality of endpoints comprising a first multicast group, with a network segmented into at least second and third multicast groups, said second and third multicast groups being subsets of said first multicast group, given ones of said endpoints being assigned to said second and third multicast groups based on likelihood of experiencing similar errors, said multicast network endpoint comprising:

a memory;

at least one processor coupled to said memory; and a non-transitory persistent storage medium which contains instructions which, when loaded into said memory, configure said at least one processor to be operative to:

facilitate registering said endpoint in said first multicast group and in only one of said second and third multicast groups;

receive a multicast of a file from an error-correcting multicast apparatus to said first multicast group over said network;

dispatch, to said error-correcting multicast apparatus, over said network, a retransmission request, based on at least one of loss and corruption of a portion of said file during said multicasting of said file to said endpoint; and receive a retransmission of said portion of said file, via multicasting, from said error-correcting multicast apparatus, over said network, to one of said second and third multicast groups.

* * * * *